Feb. 13, 1951     F. D. MATHES, JR., ET AL     2,541,429
AIRCRAFT BALANCE INDICATOR

Filed March 26, 1949     3 Sheets-Sheet 1

INVENTORS:
FRANK D. MATHES, JR.
WALTER J. CERNY
BY
Herbert E. Metcalf
Attorney

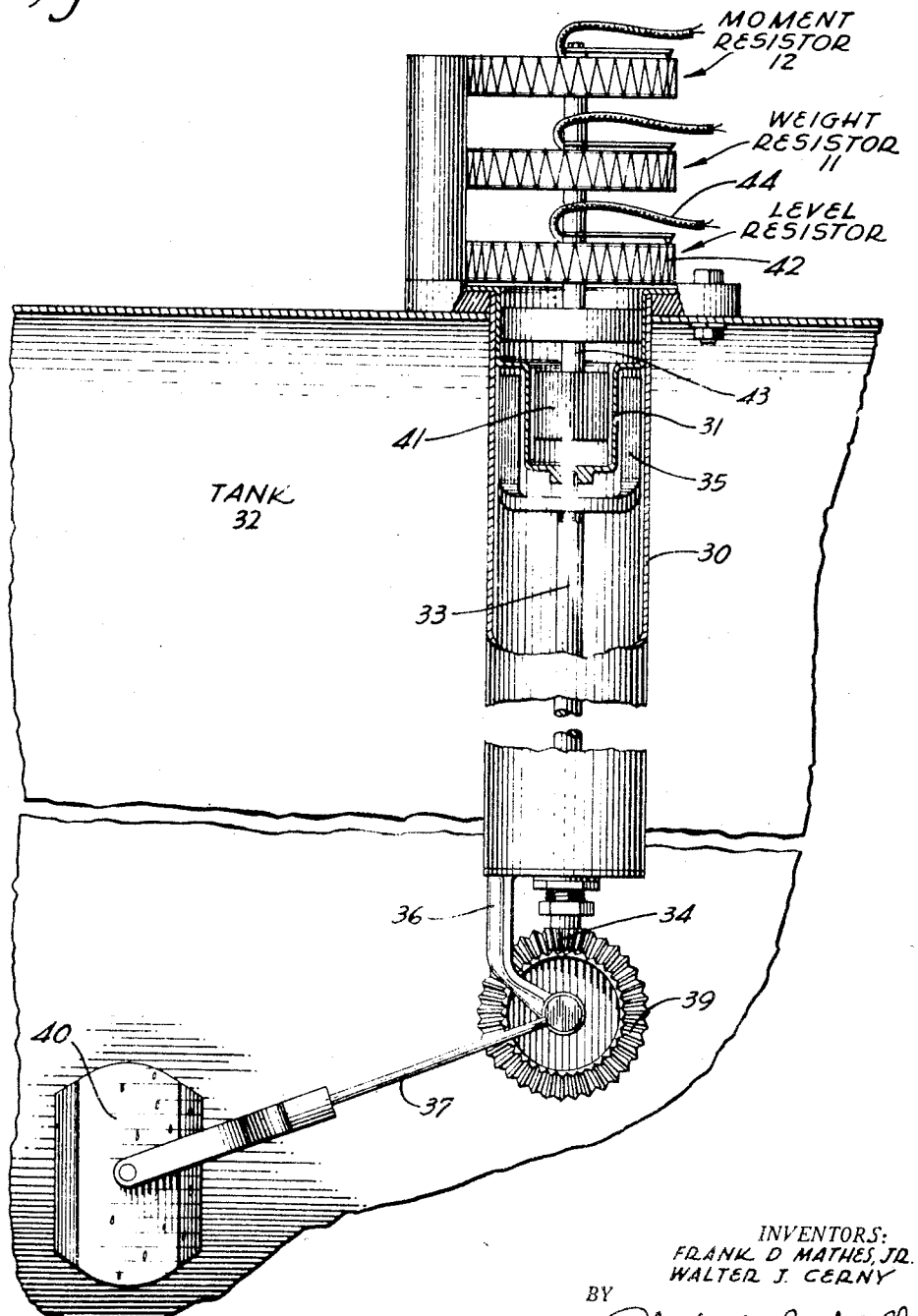

Feb. 13, 1951  F. D. MATHES, JR., ET AL  2,541,429
AIRCRAFT BALANCE INDICATOR

Filed March 26, 1949  3 Sheets-Sheet 3

INVENTORS:
FRANK D. MATHES, JR.
WALTER J. CERNY
BY
Herbert E. Metcalf
Attorney

Patented Feb. 13, 1951

2,541,429

UNITED STATES PATENT OFFICE 2,541,429

AIRCRAFT BALANCE INDICATOR

Frank D. Mathes, Jr., and Walter J. Cerny, Los Angeles, Calif., assignors to Northrop Aircraft, Inc., Hawthorne, Calif., a corporation of California Application March 26, 1949, Serial No. 83,544

7 Claims. (Cl. 73—65)

This invention relates to aircraft balance indicators and more particularly, the invention relates to a means and method for indicating the position of the center of gravity (C. G.) with respect to the mean aerodynamic chord of an airplane in flight.

The C. G. of an airplane can readily be ascertained on the ground by indicating the weights imposed on the various elements of the landing gear and then calculating or otherwise indicating the center of gravity of the airplane with respect to the mean aerodynamic chord (M. A. C.) of the airplane. All airplanes have a maximum permissible longitudinal range of the C. G. along the mean aerodynamic chord, this range usually being expressed in per cent M. A. C.

However, even when it is known that the C. G. of an airplane on the ground is properly located, it does not follow that this C. G. location will remain within the permissible range during flight, due to the loss of disposable load while in flight.

The disposable load falls mainly into two categories: one, fuel carried in tanks in the airplane and used up gradually; and two, jettisonable loads such as bombs, paratroopers and/or parachuted cargo and the like, that are usually disposed of suddenly rather than gradually.

The demand for increasing range in modern airplanes, particularly military bombers, has led to a required use of large quantities of fuel. As it is never practical to store the total amount of fuel required for a long range airplane in a single tank or to place tanks exactly on the C. G. of the airplane, it is customary to use multiple tanks placed fore and aft and/or spanwise of the C. G. in such a manner that at take-off at least, the fuel load is substantially longitudinally balanced about the C. G. of the airplane. In flight, it is of vital importance that fuel be drawn from these tanks in such a manner that this longitudinal balance is maintained at least to such an extent that C. G. travel along the M. A. C. does not exceed the permissible range.

In large airplanes, the flight engineer is charged with the responsibility of permitting fuel to be drawn from the tanks in proper sequence so that the C. G. does not move beyond permissible limits for the particular airplane involved.

However, such checking of the fuel tanks of the airplane by the flight engineer through the medium of fuel quantity gauge transmitters installed in each tank, with indicators at the flight engineer's station, involves constant monitoring and periodic calculation by the flight engineer to determine the C. G. location prior to allocating fuel withdrawal from the various tanks involved. In one specific instance of a recent long distance flight of an all-wing Air Force bomber utilizing eight jet engines for propulsion, more than 15% of the flight engineer's time was taken up in fuel consumption calculations at frequent intervals, to determine C. G. location of the airplane so that fuel could be withdrawn from the proper tanks.

It is an object of the present invention to provide a means and method of indicating the C. G. position in an airplane with respect to the mean aerodynamic chord thereof as the C. G. location changes due to fuel consumption.

It is another object of the invention to provide a C. G. indicator for an airplane in flight, operated in accordance with fuel withdrawal from the fuel tanks of the airplane, wherein provision is made for adjusting the indicator for variable or suddenly disposed loads.

In broad terms, the present invention includes the use of an electrical device providing a change in condition of an electrical circuit, this change being accomplished by the addition or removal of fuel from the airplane's fuel tanks. Such electrical devices are placed on all fuel tanks and preferably connected in series. The series of electrical devices are connected to a source of energy and an indicator. This indicator will indicate the sum of the indications of the electrical devices. Two such circuits are used, one in which the tank operated devices are calibrated to indicate weight of the fuel, and the other in which the tank operated devices are calibrated to indicate the moment of the fuel about some reference line. One indicator will then read gross weight (W) and the other indicator will then read total moment (M). The indicators are preferably then mounted in such relation that a quick reading of C. G. position can be made.

The invention will be more fully understood by reference to the drawings in which:

Figure 3 is a view partly in elevation, partly in section and partly diagrammatic of a fuel level transmitter used to actuate moment and weight circuits.

Figure 1:
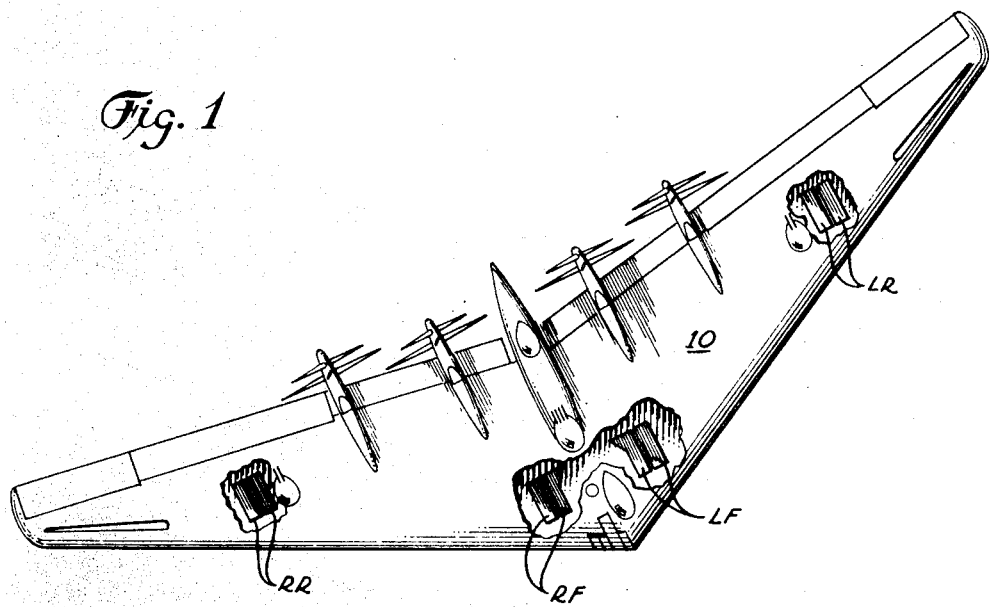
Figure 1 is a top plan view of an allwing airplane showing the position of the fuel tanks.

Referring first to Figure 1 which is a plan view of an Air Force bomber B-35, the fuel for the airplane 10 is shown as being carried in eight tanks, two left forward tanks LF, two right forward tanks RF, two left rear tanks LR, and two right rear tanks RR. All of these tanks are normally equipped with fuel level gauges for measuring gallonage with a fuel level transmitter in each tank.

Figure 2:
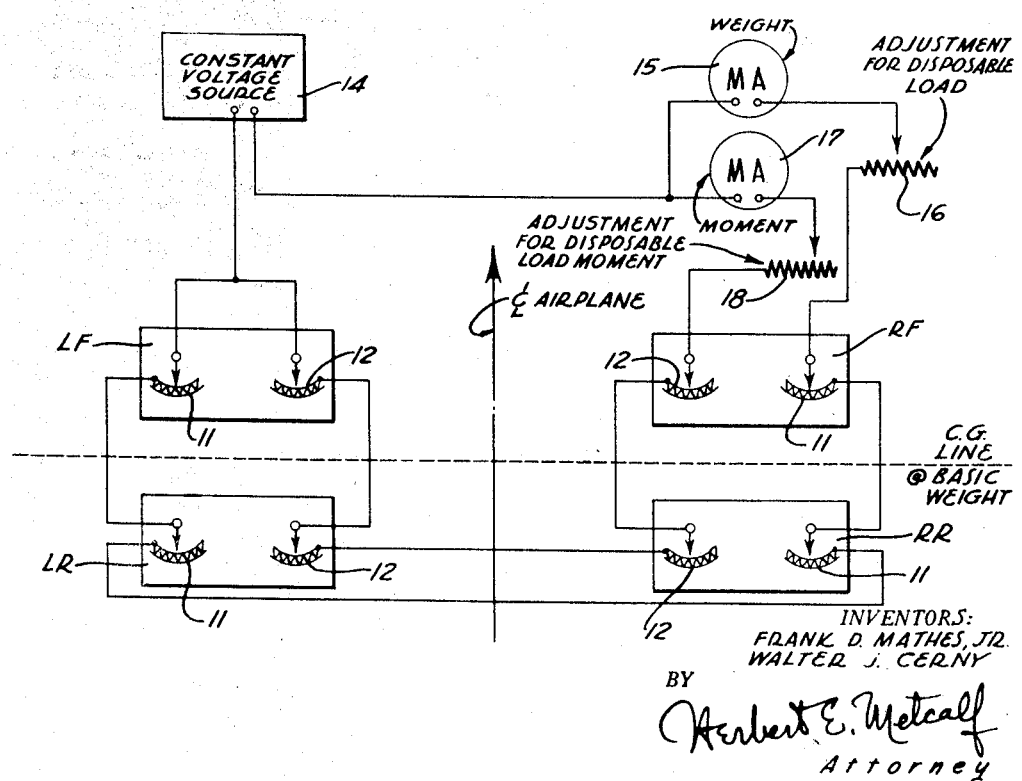
Figure 2 is a circuit diagram incorporating the present invention.

One preferred circuit that can be used for obtaining a reading of C. G. position in flight, is shown in Figure 2.

Here, for purposes of clear illustration, only four tanks are shown, these tanks being one each LF, RF, LR and RR, with the front and rear tanks on opposite sides of the C. G. line corresponding to the C. G. at the basic weight of the airplane i. e. without fuel in any tank.

Each tank is provided with a first variable resistor 11, variable in terms of the weight of the fuel in the tank, and a second variable resistor 12 variable in terms of the moment of the fuel in the tank, with the moment arms measured from some reference line of the airplane such as, for example, the nose thereof. All of the weight resistors 11 are connected in series to one side of a source of constant potential 14, the other side of this potential source is connected to a weight indicating milliammeter 15 which is connected back to the weight resistors through a weight adjustment resistor 16 to complete the weight circuit.

In a similar manner, all of the moment resistors 12 are connected in series and to one side of the potential source 14 at one end, and through a moment indicating milliammeter 17 and an adjustable moment resistor 18 back to the opposite side of the potential source.

Total weight can then be read on milliammeter 15 and total moment will be read on milliammeter 17.

As all fuel tanks in airplanes are customarily equipped with electric fuel level gauge transmitters, the C. G. resistors can conveniently be operated by the same transmitter. Figure 3 shows diagrammatically a typical fuel lever transmitter used in this particular system in airplanes. The transmitter consists of a frame 30, usually tubular, having an upper cup portion 31 sealed to the upper wall of a fuel tank 32. A vertical shaft 33 is supported in frame 30 terminating below in a pinion 34 and above in a U-shaped magnet 35 surrounding the lower part of cup 31. A bracket 36 is extended downwardly from frame 30, to which is pivoted a float lever 37 driving a gear 39 meshing with pinion 34. Lever 37 extends laterally to terminate in a float 40. Inside cup 31 is a driven magnet 41 which rotates an electrical transmitter 42 through drive shaft 43. This transmitter may consist of a variable resistance, a variable inductance, or variable capacity, shown here as a variable resistance. The output of this transmitter is taken from leads 44 which go to a gallonage meter (not shown), positioned at the flight engineer's station in the cabin of the airplane. The weight and moment variable resistors 11 and 12 respectively can then be mounted on drive shaft 43 above electrical transmitter 42. Thus, gallonage, moment, and weight indications can be taken from the same fuel level transmitter.

With the total fuel weight and total fuel moment shown, the location of the C. G. of the airplane can be obtained by reference for example to a table of weight and balance data that has been prepared for the particular airplane involved.

Figures 4, 5:
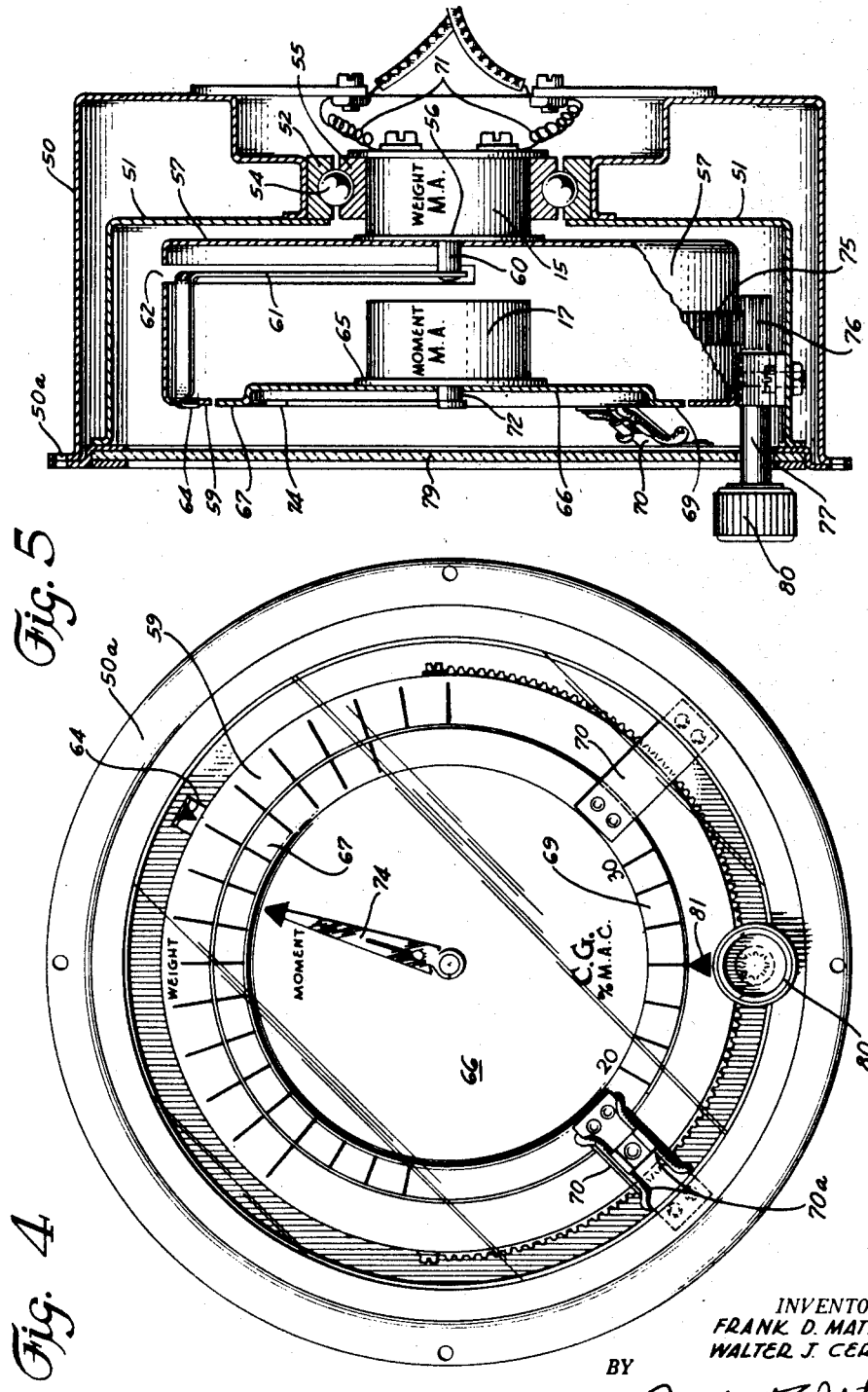
Figure 4 is a face view of a preferred form of C. G. indicator.
Figure 5 is a vertical sectional view of the indicator of Figure 4, somewhat diagrammatic.

However, the C. G. location can be more readily obtained by visually combining the readings of the weight and moment indicators 15 and 17 so that the C. G. location (or M/W) can be more quickly indicated. Such a combined indicator is shown in Figures 4 and 5.

Here, an external casing 50 is provided with a mounting flange 50a, and an internal liner 51 supporting the outer race 52 of a ball bearing 54, the inner race 55 of which is attached to the outer case 56 of the weight indicating milliammeter 15 so that this indicator is free to rotate. Case 56 of the weight indicator supports a cup 57 extending outwardly and forwardly to support a weight scale 59 in the form of a flat ring concentric with case 56.

A weight indicator shaft 60 extends forwardly from the weight indicator case 56 and carries a hand 61 extending outwardly through a hand slot 62 in the cup 57 and then forwardly to terminate in a pointer 64 moving around weight scale 59.

Forward of weight indicator shaft 60 and hand 61, is mounted the moment indicator 17 in a moment indicator case 65 to which is attached a moment indicator face 66 carrying on the upper half a moment scale 67 and on the lower half, a C. G. scale 69 graduated in per cent M. A. C. The moment indicator face 66 and the moment indicator case 65 are supported by lateral brackets 70 extending from external casing 50 to the moment indicator face 66, bridging the weight scale 59. These brackets carry the moment indicator leads 70a. Thus the entire weight unit, the case 56, the cup 57, the weight scale 59 and the hand 61 and pointer 64 can all revolve with respect to the moment indicator and flexible leads 71 are provided between the weight indicator 15 and the casing 50. The moment indicator is provided with a moment shaft 72 carrying a pointer hand 74 cooperating with the moment scale 67. Shafts 60 and 72 are coaxial.

Movement of the weight indicator unit is accomplished through a circular rack 75 attached to cup 57, which meshes with a pinion 76 mounted on a shaft 77 rotatably supported from the liner 51 of the combined indicator.

Shaft 77 extends outwardly through a glass cover 79 mounted on external case 50 and internal liner 51 to terminate in a knob 80.

A C. G. index mark 81 is placed on the bottom half of weight scale ring 59 in a position to traverse C. G. scale 69 on the lower half of the moment indicator face 66.

The operation of the device to indicate C. G. position is simple and rapid. As before described, weight and moment will be continuously indicated and will determine the position of pointers 64 and 74. When the C. G. position is to be read, the operator merely turns knob 80 until the weight pointer 64 and moment pointer 74 lie in a common radius extended from shaft 72. The C. G. is then read directly from the C. G. scale 69 as indicated by the C. G. index mark 81.

The weight scale 59, the moment scale 67, and the C. G. scale 69 can readily be calibrated for specific types of airplanes by reference to the data normally used by the airplane crew to calculate C. G. position in flight. After such calibration and with the use of resistances chosen to vary with moment and weight, the C. G. can be very closely indicated with no more effort than lining up the respective weight and moment pointers. The weight and moment reading can be modified by changing the setting of resistances 16 and 18, respectively to compensate for the weight of bombs and other disposable loads.

The system described herein as illustrative of the invention has utilized variable resistors for the transducers energizing the C. G. indicator. It should be pointed out, however, that any electrical transducer whose output can be varied in amplitude with fuel level change can be utilized in the summation circuits to permit an indication of the C. G. position.

It will thus be seen that a C. G. indication system as described herein can be set up for any airplane when the weight of the fuel in the tanks and the distance of the centers of weight of the tanks to some predetermined reference line is known. Then, with a chart showing how all other loads affect the C. G. position, the weight and moment indicators of the system can be manually set to compensate for such loads.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise the preferred form of several modes of putting the invention into effect, and the invention is, therefore, claimed in any of its forms or modifications within the legitimate and valid scope of the appended claims.

What is claimed is:

1. In an airplane having a plurality of fuel tanks spaced at different distances along the length of said airplane, a first resistance on each tank variable in accordance with the weight of fuel in said tank, a second resistance on each tank variable in accordance with the longitudinal moment of the fuel in said tank, a source of constant voltage, a weight indicating ammeter, a moment indicating ammeter, a first circuit means connecting said source, said first resistances and said weight indicating ammeter in series, a second circuit means connecting said source, said second resistances and said moment indicating ammeter in series, each of said ammeters having a shaft, a scale, and a pointer on said shaft traversing said scale, means for mounting said ammeters with their shafts coaxially positioned and with their scales concentric, adjacent and substantially in a common plane, and means for turning one of said ammeters around the shaft axis thereof to change the relative position of said scales.

2. In an airplane having a plurality of fuel tanks spaced at different distances along the length of said airplane, a first resistance on each tank variable in accordance with the weight of fuel in said tank, a second resistance on each tank variable in accordance with the longitudinal moment of the fuel in said tank, a source of constant voltage, a weight indicating ammeter, a moment indicating ammeter, a first circuit means connecting said source, said first resistances and said weight indicating ammeter in series, a second circuit means connecting said source, said second resistances and said moment indicating ammeter in series, each of said ammeters having a shaft, a scale, and a pointer on said shaft traversing said scale, means for mounting said ammeters with their shafts coaxially positioned and with their scales concentric, adjacent and substantially in a common plane, means for turning one of said ammeters around the shaft axis thereof to change the relative position of said scales, and means for indicating said change in relative position.

3. In an airplane having a supporting wing and a plurality of fuel tanks spaced at different distances along the length of said airplane, a first resistance on each tank variable in accordance with the weight of fuel in said tank, a second resistance on each tank variable in accordance with the longitudinal moment of the fuel in said tank, a source of constant voltage, a weight indicating ammeter, a moment indicating ammeter, first circuit means connecting said source, said first resistances and said weight indicating ammeter in series, second circuit means connecting said source, said second resistances and said moment indicating ammeter in series, each of said ammeters having a shaft, a scale, and a pointer on said shaft traversing said scale, means for mounting said ammeters with their shafts coaxially positioned and with their scales concentric, adjacent and substantially in a common plane, means for turning one of said ammeters around the shaft axis thereof to change the relative position of said scales and pointers, to place said pointers on the same radius, and means for indicating the change in relative position of said scales in terms of the location of the center of gravity of said airplane with respect to the mean aerodynamic chord of said wing.

4. In an airplane having a plurality of fuel tanks spaced at different distances along the length of said airplane, a first resistance on each tank variable in accordance with the weight of fuel in said tank, a second resistance on each tank variable in accordance with the longitudinal moment of the fuel in said tank, a source of constant voltage, a weight indicating ammeter, a moment indicating ammeter, a first circuit means connecting said source, said first resistances and said weight indicating ammeter in series, a second circuit means connecting said source, said second resistances and said moment indicating ammeter in series, said weight indicating ammeter having a shaft, an annular scale bearing face, and a pointer attached to said shaft to traverse a portion of said face, said moment indicating ammeter having a shaft, an annular scale bearing face, and a pointer attached to said shaft to traverse a portion of said latter face, means for mounting said ammeters on said airplane with said shafts coaxial and with said annular faces concentric and substantially in a common plane, there being a weight scale on that portion of the face of said weight indicating ammeter traversed by the pointer of said latter ammeter, a moment indicating scale on that portion of the face of said moment indicating ammeter traversed by the pointer of said latter ammeter, an index on that portion of the face of one indicating ammeter not occupied by an indicating scale and a third scale on that portion of the face of the other indicating ammeter not occupied by an indicating scale, said index being positioned to traverse said third scale when relative rotation of said faces occurs, means for rotating one of said ammeters, its pointer and its scale on said mounting means with respect to the other ammeter, pointer and scale around the axis of said shafts to place said pointers on the same radius, thereby traversing said third scale with said index.

5. In an airplane having a wing and a plurality of fuel tanks spaced at different distances along the length of said airplane, a first resistance on each tank variable in accordance with the weight of fuel in said tank, a second resistance on each tank variable in accordance with the longitudinal moment of the fuel in said tank, a source of constant voltage, a weight indicating ammeter, a moment indicating ammeter, a first circuit means connecting said source, said first resistances and said weight indicating ammeter in series, a second circuit means connecting said source, said second resistances and said moment indicating ammeter in series, said weight indicating ammeter having a shaft, an annular scale bearing face, and a pointer attached to said shaft to traverse a portion of said face, said moment indicating ammeter having a shaft, an annular scale bearing face, and a pointer attached to said shaft to traverse a portion of said latter face, means for mounting said ammeters on said airplane with said shafts coaxial and with said annular faces concentric and substantially in a common plane, there being a weight scale on that portion of the face of said weight indicating ammeter traversed by the pointer of said latter ammeter, a moment indicating scale on that portion of the face of said moment indicating ammeter traversed by the pointer of said latter ammeter, an index on that portion of the face of the weight indicating ammeter not occupied by said weight indicating scale and a third scale on that portion of the face of said moment indicating ammeter not occupied by said moment indicating scale, said index being positioned to traverse said third scale when relative rotation of said faces occurs, means for rotating one of said ammeters, its pointer and its scale on said mounting means with respect to the other ammeter, pointer and scale around the axis of said shafts to place said pointers on the same radius, thereby traversing said third scale with said index, said third scale being calibrated in terms of percent of the mean aerodynamic chord of the wing of said airplane to indicate the position of the center of gravity of said airplane as controlled by the weight and moment of fuel in said tanks.

6. Apparatus in accordance with claim 5 wherein a first separate manually variable resistance is placed in series in said first circuit means, and a second manually variable resistance is placed in said second circuit means, whereby the position of the pointers on each of said ammeters can be manually changed in accordance with disposable airplane load other than the fuel in said tank.

7. In an airplane having a plurality of fuel tanks, spaced at different distances along the length of said airplane, a first electrical means on each tank variable in output in accordance with the weight of fuel in said tank, a second electrical means on each tank variable in output in accordance with the longitudinal moment of said tank, a first electrically responsive means connected to indicate the sum of the output of said first electrical means, a second electrically responsive means connected to indicate the sum of the output of said second electrical means, each of said electrically responsive means having a shaft, a scale, and a pointer on said shaft traversing said scale, means for mounting said electrically responsive means with their shafts coaxially positioned and with their scales concentric, adjacent and substantially in a common plane, means for turning one of said electrically responsive means around the shaft axis thereof to change the relative position of said scales, and means for indicating the change in relative position of said scales.

FRANK D. MATHES, Jr.
WALTER J. CERNY.

REFERENCES CITED

The following references are of record in the file of this patent:

UNITED STATES PATENTS

| Number | Name | Date |
|---|---|---|
| 1,406,312 | Wessoleck | Feb. 14, 1922 |
| 2,425,685 | Pinder et al. | Aug. 12, 1947 |
| 2,443,098 | Dean | June 8, 1948 |
| 2,483,266 | De Giers et al. | Sept. 27, 1949 |